Patented Aug. 22, 1950

2,520,086

UNITED STATES PATENT OFFICE 2,520,086

BLENDED OLEFINIC COPOLYMERS

George E. Ham, Dayton, Ohio, assignor to Monsanto Chemical Company, St. Louis, Mo., a corporation of Delaware No Drawing. Application July 29, 1948,
Serial No. 41,405

2 Claims. (Cl. 260—45.5)

This invention relates to new plastic compositions having unusual adaptability in the fabrication of transparent wrapping films, raincoats and shoe soles. More specifically the invention relates to blends of copolymers which have utility not possessed by either of the blended components.

Copolymers of methyl methacrylate and vinyl acetate are known to the art but they are rigid materials not capable of use as films where flexibility is required. Furthermore, copolymers of butyl acrylate and vinyl acetate are known but these materials are soft and tacky. Both of the known copolymers have very narrow temperature ranges wherein the flexibility is suitable.

The purpose of this invention is to provide a method of preparing film forming compositions having utility over a wide temperature range. A further purpose of this invention is to prepare transparent films of superior quality.

The primary purpose of this invention is to provide a new copolymeric substance having excellent physical properties unusually adapted to the fabrication of thin wrapping films, raincoats and shoe soles having a utility over wide ranges of temperature. A further purpose of this invention is to provide copolymers of methyl methacrylate and vinyl acetate which have unusual flexibility and tensile strength.

The relationship of temperature and flexibility of a plastic composition is most conveniently evaluated by a procedure known as the Clash-Berg test. In accordance with this procedure a copolymer sample is prepared by compression molding to form a standard sized bar which is then cooled to a temperature of approximately −50° C. and permitted to warm gradually to room temperature while measuring the deflection by the application of a constant torque. The stiffness modulus may thus be readily determined over the entire range of temperatures to which the sample is subjected. It is generally recognized that plastic compositions which have a stiffness modulus in excess of 135,000 pounds per square inch at room temperature are too inflexible for many applications, and that the stiffness modulus should not be less than 2000 pounds per square inch which is the lower limit of practical utility. For almost every plastic composition there is a temperature at which the stiffness modulus is 135,000 pounds per square inch and another temperature at which the modulus of rigidity is 2000 pounds per square inch. Obviously, a plastic composition will be of general utility only at temperatures between the critical temperatures where the desirable maximum and minimum moduli of elasticity are experienced. The difference between these temperatures is known as the "stifflex range" and is an effective measurement of the utility of the plastic composition. The temperature at which the composition has a modulus of elasticity of 135,000 pounds per square inch is known as the "flex temperature" and represents the minimum temperature at which desirable flexibility properties are found.

In general a plastic composition will have some utility regardless of its "flex temperature" and "flex range," but compositions having the lowest flex temperature and the broadest flex range are most desirable as flexible materials. A plastic composition should have a flex temperature lower than 10° C. and a stifflex range in excess of 30° C. Compositions having these properties will have desired flexibility throughout the entire range of temperatures usually encountered in most applications as wrapping films.

In accordance with this invention it has been found that by blending copolymers with undesirable flexibility properties new compositions having desired flex properties may be prepared. Copolymers of 10 to 60 percent of methyl methacrylate and 40 to 90 percent of vinyl acetate are rigid compositions with very little flexibility which soften at temperatures slightly above room temperature, and lose their utility as wrapping films. Copolymers of 40 to 75 per cent of butylacrylate and 25 to 60 percent of vinyl acetate having low flex temperatures but because of the narrow stifflex range they become too soft for general utility at normal room temperatures. Furthermore, these latter copolymers are tacky and are otherwise unsatisfactory as a commercial film. It has been found that blends of 35 to 65 percent of either of the two types of copolymer are unusually adapted to film fabrication and the resulting compositions have desirable tensile properties, and flexibility over a wide range of temperatures, including all temperatures usually encountered by commercial films. Physical blends of between 40 and 60 percent of either component produce compositions of optimum and therefore preferred physical properties.

Each of the copolymeric components may be prepared by any of the several well known polymerization methods, but polymerization in an aqueous emulsion is most desirable. In the preparation of the copolymers by aqueous emulsion polymerization the monomers may be contacted in the presence of water, a suitable peroxy catalyst, and preferably an emulsion stabilizing agent. If desired all of the monomers to be copolymerized may be charged to the polymerization reactor at the beginning of the reaction, but the preferred practice involves the mixing of the monomers in a separate charging vessel, adding the mixture to the water maintained under conditions of polymerization in the presence of a suitable catalyst.

The emulsion polymerizations are catalyzed by means of any water soluble peroxy compound, for example sodium peroxide, hydrogen peroxide, sodium perborate, the sodium salts of other peroxy acids, the potassium, ammonium and and other water soluble salts of peroxy acids, and any other water soluble compounds containing a peroxy radical. The quantity of peroxy compounds may be from 0.01 to 1.0 percent by weight of the polymerizable compound. The catalyst may be charged at the beginning of the reaction, or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation, it is generally desirable to promote the uniform distribution of reagents by using surface active agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps," such as triethanol amine and dodecyl methyl amine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 percent by weight of the monomers may be employed.

Emulsion polymerization reactions are conducted at elevated temperatures, but preferably at the reflux temperature of the emulsion which will usually be between 70° C. and 80° C. The polymerization temperatures should be maintained substantially constant, and by operation at reflux temperatures the monomers may be added at such rates that the temperature is maintained at a constant temperature, for example ±1° C. Under such conditions the optimum quality of the product is obtained.

The reaction is preferably initiated by charging the reactor with water containing the catalyst and emulsifier in solution, and thereafter increasing or decreasing the rate of mixed monomer addition as is required to maintain a constant reflux temperature. If desired the monomers may each be added in a separate stream. In order to avoid unduly high concentrations of emulsifier in the reaction mass at the beginning of the reaction, most of it may be mixed with the monomers and added therewith during the reaction. Preferably only a small proportion of the catalyst is charged at the beginning of the reaction, and the remainder is added either continuously or intermittently throughout the course of the reaction. The preferred manner of operation involves heating the water containing a small amount of catalyst and emulsifier to approximately the ultimate polymerization temperature, and initiating the reaction by introducing the stream of mixed monomers.

The emulsion polymerizations are preferably conducted in glass or glass-lined vessels, which are provided with means for agitating the contents thereof. Generally rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

The two copolymers may be blended on a roll mill, a Banbury mixer or any other conventional rubber mixing machinery. Since both of the copolymeric components from the blend so prepared soften readily at elevated temperatures, the blend may be prepared in a dough mixer or other type of mixing machine adapted for mixing soft plastic materials if the mixer and the components to be blended are warmed to a temperature of 50 to 100° C. Other mixing methods may involve the partial dissolution in suitable organic solvents which one may readily remove subsequent to the mixing operation.

Although the principal use of the new blended compositions lies in the field of transparent films which are free of other plasticizing materials, special applications may involve the compounding of the blended copolymer with modifying substances, such as plasticizers, pigments, dyes, heat and light stabilizing materials, and other conventional additives.

The new blended copolymers are of particular utility in the fabrication of flexible films suitable for wrapping foods, or any other application where plasticizer migration is objectionable. The blended copolymers are also suited to compression molding procedures because of their toughness and tensile strength.

Further details of the practice of this invention are set forth with respect to the following examples.

Example 1

A copolymer of 50 percent methyl methacrylate and 50 percent vinyl acetate was prepared by emulsion polymerization in aqueous medium by charging the pre-mixed monomers gradually to a solution of 0.25 percent of the di-2-ethylhexyl ester of sodium sulfosuccinic acid and 0.05 percent of potassium persulfate maintained at 75° C. The resulting copolymer was transparent and strong, but was too rigid to be useful in film fabrication. The flex temperature was +40° C., the stiflex temperature range was only 18° C.

A copolymer of 50 percent vinyl acetate and 50 percent butyl acrylate was prepared by mixed monomer polymerization in aqueous medium. The resulting polymer had a flex temperature of —23° C. and had a narrow stiflex range of 25° C.

Equal parts by weight of the two copolymers were milled on a Throppe roll for five minutes at 100° C. A homogeneous composition was so obtained which could be cast or calendered to form strong, transparent films. The flex temperature of the blend was −4° C. and the stifflex range was 52° C.

*Example 2*

Using the procedure described in the preceding example, a copolymer of 80 percent by weight of vinyl acetate and 20 percent of methyl methacrylate, which had a flex temperature of 27° C. and a stifflex range of 15° C., was milled with equal parts by weight of a copolymer of 50 percent vinyl acetate and 50 percent of butyl acrylate, which had a flex temperature of −23° C. and a stifflex range of 25° C. The resulting blend was entirely compatible and formed clear, transparent films. The flex temperature of the blend was −6° C. and the stifflex range was found to be 48° C.

The invention involves the methods and products set forth in the following claims.

1. A film forming composition which comprises a homogeneous blend of 35 to 65 parts by weight of a copolymer of a mixture of monomers consisting of 10 to 60 percent by weight of methyl methacrylate and 40 to 90 percent of vinyl acetate, and 65 to 35 parts by weight of a copolymer of a mixture of monomers consisting of 40 to 75 percent of butyl acrylate and 25 to 60 percent of vinyl acetate.

2. A film forming composition which comprises a homogeneous blend of from 40 to 60 parts by weight of a copolymer of a mixture of monomers consisting of 10 to 60 percent of methyl methacrylate and 90 to 40 percent of vinyl acetate, and from 60 to 40 parts by weight of a copolymer of a mixture of monomers consisting of 40 to 75 percent by weight of butyl acrylate and 60 to 25 percent of vinyl acetate.

GEORGE E. HAM.

REFERENCES CITED

The following references are of record in the file of this patent:

UNITED STATES PATENTS

| Number | Name | Date |
|---|---|---|
| 2,117,321 | Hill | May 17, 1938 |
| 2,123,474 | Redman | July 12, 1938 |

FOREIGN PATENTS

| Number | Country | Date |
|---|---|---|
| 674,712 | Germany | Apr. 21, 1939 |